United States Patent [19]

Ekhoff

[11] Patent Number: 4,891,722
[45] Date of Patent: Jan. 2, 1990

[54] INCREMENTAL STEPPING ASSEMBLY FOR A ROTARY ACTUATOR

[76] Inventor: Donald L. Ekhoff, 14137 Hidden Spring La., Morgan Hill, Calif. 95037

[21] Appl. No.: 199,614

[22] Filed: May 27, 1988

[51] Int. Cl.$^4$ ............................................. G11B 5/55
[52] U.S. Cl. ..................................... 360/106; 360/105
[58] Field of Search ......................................... 360/106

[56] References Cited

U.S. PATENT DOCUMENTS

| | | |
|---|---|---|
| 3,984,873 | 10/1976 | Pejcha ................................. 360/105 |
| 4,745,504 | 5/1988 | Foote ................................... 360/106 |

*Primary Examiner*—A. J. Heinz
*Attorney, Agent, or Firm*—Thomas Schneck

[57] ABSTRACT

A rotary actuator for testing of magnetic disks having a rotary arm pivotally attached to an actuator housing at a first end and having at least one transducer at an opposite end. The rotary arm is mounted to the hub of a motion transfer wheel segment having an arcuate outer edge. A bearingless motor-powered drive roller is in frictional contact with the arcuate outer edge to impart rotational motion to the wheel segment. A pair of pressure wheels contact the drive roller to form a triangle of rollers and to positionally capture the drive roller against the arcuate outer edge. Rotation of the drive roller is translated to the rotary arm via the wheel segment, and causes the transducer to move along an arcuate path across a magnetic disk to be tested.

17 Claims, 2 Drawing Sheets

INCREMENTAL STEPPING ASSEMBLY FOR A ROTARY ACTUATOR

TECHNICAL FIELD

The present invention relates generally to apparatus for information recording and reproducing on a magnetic memory disk and relates particularly to apparatus for accurate positioning of a transducer relative to a magnetic disk.

BACKGROUND ART

In magnetic memory disks, information is recorded in concentric tracks on both sides of a disk. Read/write heads are moved to a particular track to gain access to the information recorded in that track. The tracks on a side of a magnetic disk are extremely closely spaced, making it difficult to meet the requirement for high-speed movement of a read/write head. Requirement of head movement within a 15 microsecond time window is typical.

Until recently, most read positioning of read/write heads has been provided by a linear actuator which moves the heads radially along the disk. Thus, in most instances the heads and the carriage which supports the heads move across the disk in a straight line manner. As noted in U.S. Pat. No. 3,984,873 to Pejcha, one disadvantage of the linear actuator involves the inertia which must be overcome during rapid acceleration or deceleration of the carriage which supports the heads. Ringing, i.e. oscillation of the heads following deceleration, is detrimental to efforts to minimize the time required for head repositioning.

The Pejcha patent teaches an actuator which moves the head along an arcuate path across a disk. The rotary actuator mounts the heads at the end of an arm assembly which is pivoted at the opposite end. The heads therefore are moved about the maximum radius of the apparatus so that higher acceleration can be gained for quick access to the desired information. Moreover, the end of the arm supporting the heads presents less inertial resistance to movement, thereby permitting rapid acceleration between positions.

While the industry has been moving toward use of rotary actuators over linear actuators, quality control in the production of magnetic memory disks is still performed using linear actuators. One step in the testing of memory disks is the recordation of data on the disk to verify that the disk will indeed accept information. Clearly, it is best to perform such verification by use of an actuator which simulates the characteristics of an actuator of eventual use. Because rotary actuators include arcuate translation to move heads, there is an angular error to consider which need not be considered with respect to linear actuators.

Because accuracy is critical, the prior art teaches that the arm supporting a read/write head is to be driven directly by the motor, thereby eliminating ball bearing assemblies which would be necessary if the motor were to drive rollers. Bearing assemblies require spacing tolerances that lead to errors. Direct drive of the arm, however, limits the torque which may be applied to the arm by the motor since maximum torque is increased as the motor is distanced from the arm to be pivoted.

It is an object of the present invention to provide a rotary actuator to be used in memory disk testing which incorporates incremental stepping functions to simulate disk drive characteristics with extreme accuracy and repeatability.

SUMMARY OF THE INVENTION

The above object has been met by a rotary actuator having a head-carrying arm which receives rotational motion from a bearingless drive roller that is captured in place. The drive roller has an axis of rotation spaced apart from the rotational axis of the arm. The drive roller is captured by two free-spinning pressure wheels.

The head-carrying arm is a rotary arm having at least one transducer at a first end. At a second end distal the transducer, the rotary arm is pivotally supported at an axis of arm rotation. Movement of the rotary arm about the axis of arm rotation results in travel of the transducer along an arcuate path. A motion transfer wheel segment is fixed at an inner end to an assembly which includes the rotary arm. The outer edge of the motion transfer wheel segment is arcuate. A drive roller is in frictional contact with the arcuate outer edge of the motion transfer wheel segment so that the drive roller is in rotation transfer communication with the rotary arm via the wheel segment. An electric stepper motor is used to rotate the drive roller.

First and second free-spinning pressure wheels are in frictional contact with the circumferential periphery of the drive roller. The pressure wheels combine with the drive roller to form a triangle of rollers and to capture the drive roller against the arcuate outer edge of the motion transfer wheel segment.

An advantage of the present invention is that the drive roller may be a bearingless roller. Thus, the rotary actuator is not susceptible to errors caused by shifting of the drive roller within the spacing tolerance of a bearing assembly. The pressure wheels are supported by bearing assemblies, but even after shifting the pressure wheels provide a component of force to trap the drive roller against the motion transfer wheel segment. Another advantage is that the drive roller has an axis of rotation spaced apart from the rotational axis of the rotary arm, thereby increasing the torque provided by the stepper motor in rapid acceleration and deceleration of the rotary arm. The magnitude of the torque is dependent upon the length of the motion transfer wheel segment.

BEST MODE FOR CARRYING OUT THE INVENTION

Figure 1:
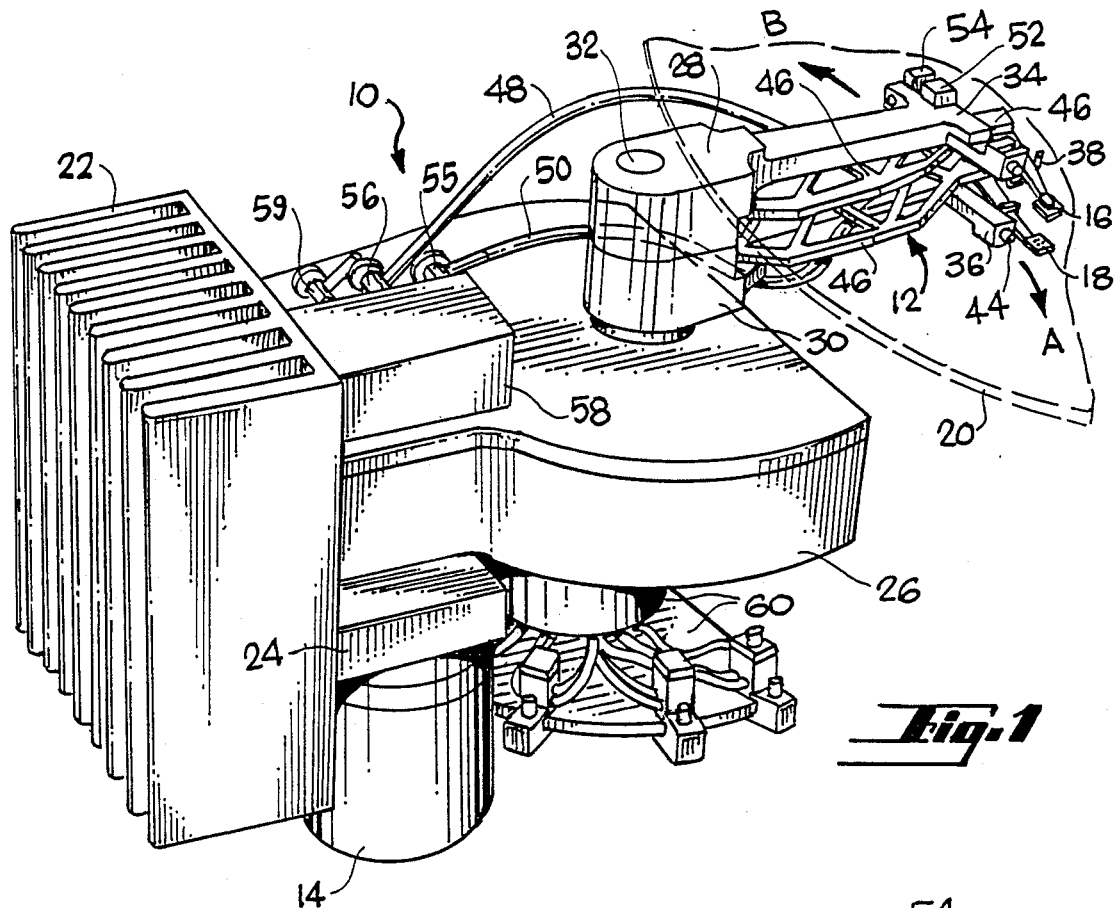
FIG. 1 is a perspective view of a rotary actuator in accord with the present invention.
Figure 2:
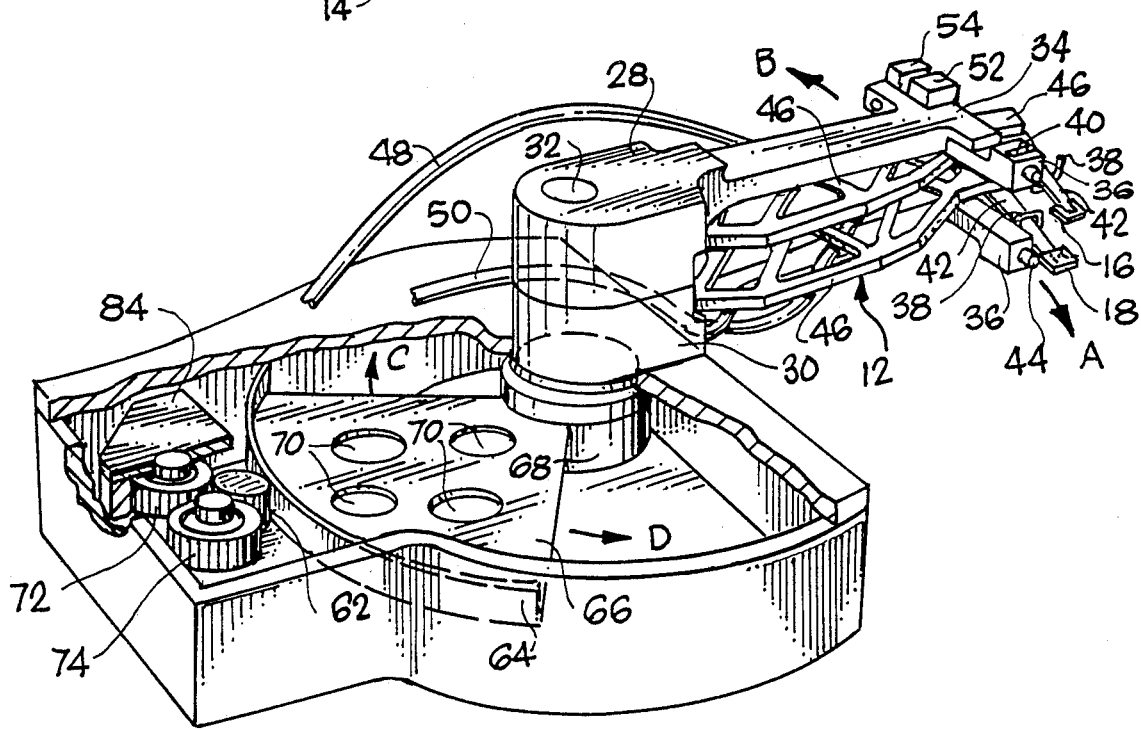
FIG. 2 is a perspective, partially cutaway view of the drive assembly of FIG. 1.

With reference to FIGS. 1 and 2, a rotary actuator 10 is shown having a rotary arm 12 and a stepper motor 14 for reciprocating motion of the rotary arm. Movement of the rotary arm 12 displaces read/write heads 16 and 18 along an arcuate path to read opposite sides of a magnetic memory disk 20. The stepper motor 14 is capable of highly accurate positioning, moving at 25,000 steps per revolution. The stepper motor is reversible to permit movement of the rotary arm 12 in either the direction of arrow A or of Arrow B. A heat sink 22 having a plurality of fins is included to dissipate heat, thereby reducing the risk of inaccuracies that are due to metal expansion.

The stepper motor 14 is mounted to a metal block 24 at the lower surface of a housing 26. The rotary arm 12 is pivotally fixed to the housing 26 and includes upper and lower support bodies 28 and 30 to enable the read/write heads 16 and 18 to straddle the disk 20. The support bodies 28 and 30 have a common shaft 32 at an end distal the heads 16 and 18. Operation of the stepper motor 14 causes the support bodies to pivot about the center of shaft 32.

The extensions of the support bodies 28 and 30 which straddle the magnetic disk 20 each have T-shaped ends 34. A mounting block 36 on one leg of the T-shaped end 34 of a support body is used to secure a bead wire 38. The bead wire fits within a slot 40 of a mounting block 36 and is shaped to position a flexure 42 on which the read/write heads 16 and 18 are fastened. A set screw 44 penetrates the mounting block 36 to trap the bead wire within the slot 40 of the mounting block.

The flexure 42 is a V-shaped member made of a resilient material. The ends of the flexure distal the read/write head 16 are mounted to a truss plate 46. Each of the support bodies 28 and 30 includes a truss plate 46 so that the magnetic disk 20 is fit between the truss plates.

During operation a read/write head 16 and 18 may be moved between a loaded position in contact with a magnetic disk 20 and an unloaded position by a vertical pivoting motion of the bead wire 38. The pivoting motion causes the bead wire to apply pressure to the flexure 42 which positions the head. A read/write head is biased into an unloaded position away from the disk, but the bias may be overcome by application of air through pneumatic hoses 48 and 50. Biasing into an unloaded position is accomplished by a spring located between stationary block 52 and pivoting block 54 at the T-shaped end 34 of a support body.

A pair of throttling needle valves 55 and 56 control air pressure to the pneumatic hoses 48 and 50. The throttling needle valves are attached to an air chamber housing 58. A master needle valve 59 permits air flow from a pressure source, not shown, to an air chamber within the housing 58. Air flow directly from a pressure source to the pneumatic hoses could result in damage to a disk since the volume of air needed to move a read/write head from an unload position to a load position in communication with the disk is extremely small. This risk is removed by requiring the pressure source to supply air to the volume of the air chamber as well as to the pneumatic hoses 48 and 50.

Figure 3:
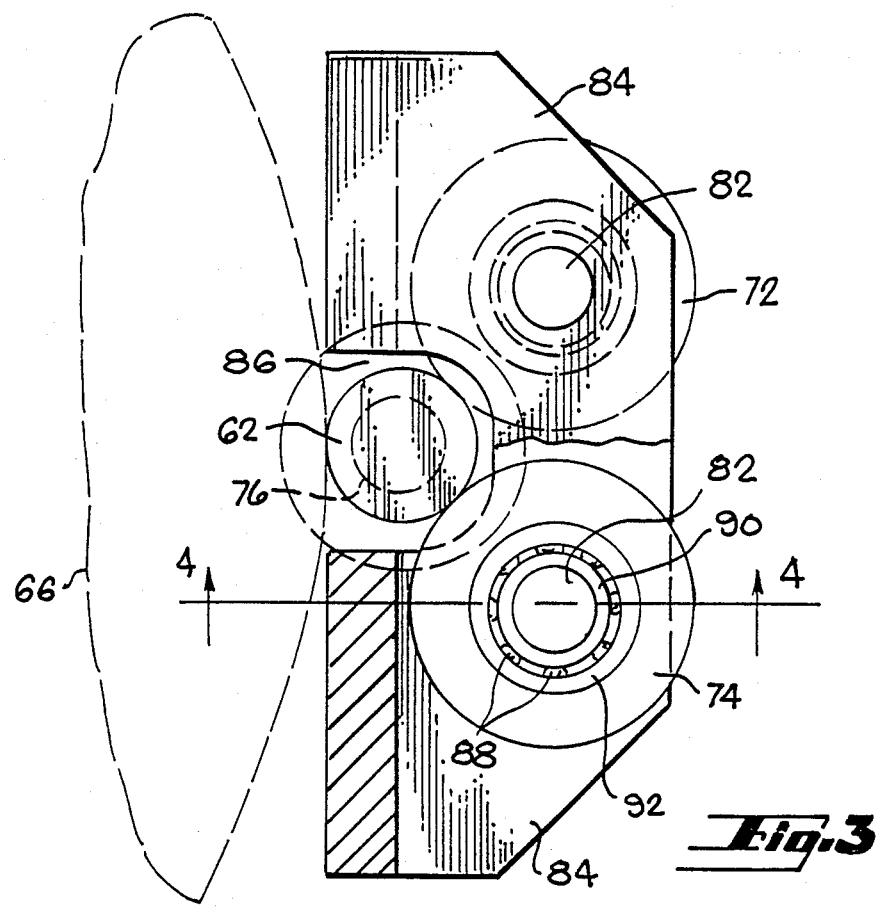
FIG. 3 is a top view of the roller assembly of FIG. 2.
Figure 4:
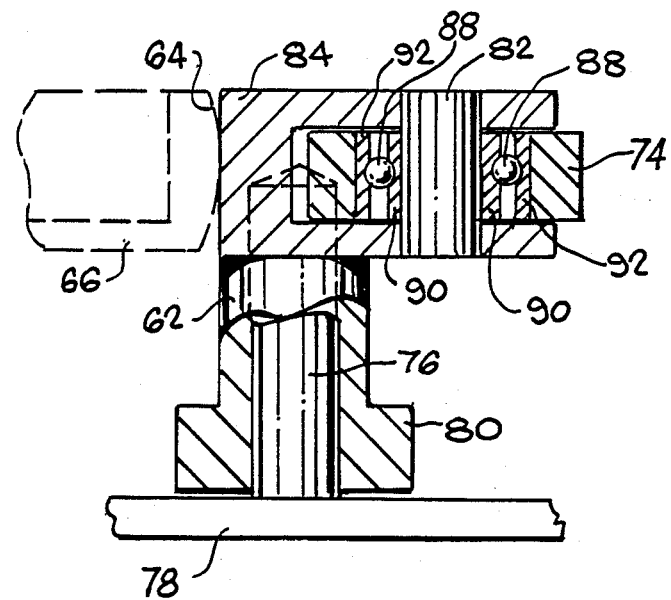
FIG. 4 is a side sectional view of the roller assembly of FIG. 3 taken along lines 4—4.

As noted above, operation of the stepper motor 14 is translated to the rotary arm 14 to cause the read/write heads 16 and 18 to move along an arcuate path across disk 20. An optical encoder 60 is used to verify the positional accuracy of the heads. The optical encoder 60 is of the type commonly known in the field. Referring now to FIGS. 2-4, a stepper motor powers a drive roller 62. The circumferential periphery of the drive roller 62 is in frictional contact with an arcuate outer edge 64 of a motion transfer wheel segment 66. A hub 68 is integral the wheel segment 66 so that motion of the wheel segment rotates the hub 68. This rotation of the hub is translated to the rotary arm 12 via the common shaft 32. The motion transfer wheel segment 66 receives reciprocating motion, as shown by arrows C and D. Holes 70 are included to reduce inertia.

In most applications a drive roller is supported in place by a bearing assembly. As shown in FIGS. 3 and 4, however, the present invention eliminates the use of a bearing assembly. Such assemblies by necessity include a spatial tolerance which would not be advantageous to the operation of the rotary actuator. Since movements of the drive roller 62 would then result in a decrease in positioning accuracy of the read/write heads. However, by trapping the drive roller 62 between a pair of free-spinning pressure wheels 72 and 74, the drive roller 62 is captured in position against the arcuate outer edge 64. The bearingless driver roller provides a greater degree of accuracy and repeatability in the displacement of a read/write head.

The drive roller 62 is fixed on a motor shaft 76 projecting through a motor plate 78. The drive roller includes a shoulder 80 at a lower end and is in frictional contact with the wheel segment 66 at an upper end.

The free-spinning pressure wheels 72 and 74 each rotate about a fixed shaft 82 mounted to a C-shaped bracket 84. The bracket 84 includes a cutaway portion 86 to permit passage of the drive roller 62. The pressure wheels 72 and 74 fit within the spacing of the C-shaped bracket and are mounted on bearing assemblies. The bearing assemblies include a plurality of ball bearings 88 within grooves of the opposed bearing surfaces 90 and 92.

Because the free-spinning pressure wheels 72 and 74 include bearing assemblies, the pressure wheels are associated with spatial tolerances. However, unlike a positional movement of the drive roller, movement of the pressure wheels does not result in inaccuracies of a read/write head. Should the pressure wheels move, both will continue to exert a component of force upon the drive roller and will capture the drive roller against the motion transfer wheel segment 66. It has been discovered that the angle of rollers 62, 72 and 74 limits a rotary actuator to an absolute and non-accumulative error of 0.00002 inches in either single step or multi-step functions, at the end of a four-inch arm. Thus, it is possible to employ the rotary actuator for use in memory disk testing and to incorporate incremental stepping functions to simulate disk drive characteristics with extreme accuracy and repeatability of positions.

In operation, the shaft 76 of a stepping motor rotates a drive roller 62 which is captured by a pair of free-spinning pressure wheels 72 and 74. The pressure wheels positionally trap the drive roller against an arcuate outer edge 64 of a motion transfer wheel segment 66. In this manner the drive roller remains stationary during rapid acceleration and deceleration. The motion of the drive roller is imparted to the wheel segment 66 to turn hub 68. As shown in FIG. 2, the rotary arm 12 is mounted to the hub 68 and rotation of the hub causes the read/write heads 16 and 18 to move along an arcuate path across a disk.

The bearingless drive roller permits the motor to be removed from the axis of rotation of the rotary arm 12. By controlling the motion transfer wheel segment 66 rather than directly rotating the rotary arm 12, a greater amount of torque is provided for rapid acceleration and deceleration of the rotary arm without a corresponding loss in positional accuracy.

I claim:
1. A rotary actuator for the recording and reading of information on a magnetic disk, comprising,
a rotary arm having at least one transducer at a first end, said rotary arm having a second end pivotally supported at an axis of arm rotation, the movement of said rotary arm about said axis of arm rotation effecting travel of the transducer along an arcuate path, a drive roller in rotation transfer communication with said rotary arm, at least two free-spinning pressure wheels, each in frictional contact with the circumferential periphery of said drive roller, and a motor means in engagement with said drive roller for rotating the drive roller about an axis parallel said axis of arm rotation, thereby pivoting said rotary arm.

2. The rotary actuator of claim 1 wherein said pressure wheels are two in number, said drive roller and said pressure wheels combining to form a triangular configuration.

3. The rotary actuator of claim 1 wherein said pressure wheels are spaced apart from each other.

4. The rotary actuator of claim 1 further comprising a motion transfer wheel segment having an arcuate outer edge in frictional contact with said drive roller and having an inner end fixed to said rotary arm, rotational motion of said drive roller being translated to said rotary arm via said wheel segment.

5. The rotary actuator of claim 1 having two transducers, said transducer being read/write heads for operation with a magnetic memory disk.

6. The rotary actuator of claim 1 wherein said drive roller is a bearingless roller.

7. The rotary actuator of claim 1 wherein said pressure wheels are supported in frictional contact with said drive roller by ball bearing assemblies.

8. The rotary actuator for the reading and writing of information on a magnetic disk, comprising, an actuator housing, a rotary arm having an inner end pivotally attached to said actuator housing at a first axis of rotation, a first transducer fixed to an outer end of said rotary arm opposite said inner end, a drive roller in rotation transfer communication with said rotary arm, a drive means in engagement with said drive roller for rotating said drive roller about a second axis of rotation parallel said first axis, thereby displacing said first transducer along an arcuate path, and a first and second free-spinning pressure wheel, each pressure wheel in frictional contact with said drive roller, said pressure wheels and said drive wheel forming a triangular configuration.

9. The rotary actuator of claim 8 wherein said first and second pressure wheels are spaced apart.

10. The rotary actuator of claim 8 wherein said drive roller is a bearing free roller.

11. The rotary actuator of claim 8 further comprising a motion transfer wheel segment having an arcuate outer edge in frictional contact with said drive roller and having an inner end fixed to said rotary arm, rotational motion of said drive roller being translated to said rotary arm via said wheel segment.

12. The rotary actuator of claim 8 having a second transducer, said transducers each being read/write heads for transfer of information with a magnetic disk.

13. The rotary actuator of claim 8 wherein said drive means is a stepper motor.

14. A rotary actuator for quality control of magnetic disks, comprising, an actuator housing, an electric stepper motor fixed to said actuator housing, a bearingless drive roller attached to said stepper motor, said drive roller having a first vertical axis of rotation, first and second spaced-apart pressure wheels, each having a circumferential periphery in frictional contact with said drive roller, said drive roller and said pressure wheels combining to form a triangular configuration, a rotary arm pivotally attached to said actuator housing for oscillating motion about a second vertical axis of rotation parallel said first vertical axis, said rotary arm being in communication with said drive roller for translation of rotational energy with said drive roller, and at least one read/write head fixed to said rotary arm, said read/write head positioned to move along an arcuate path upon pivoting of said rotary arm.

15. The rotary actuator of claim 14 wherein each of said pressure wheels is supported for rotation by ball bearing assemblies.

16. The rotary actuator of claim 14 having a second read/write head having an orientation opposite said first read/write head.

17. The rotary actuator of claim 14 wherein said first and second pressure wheels and said drive roller each are cylindrical members having parallel axis of rotation.

* * * * *